(12) United States Patent
Sipos

(10) Patent No.: US 6,793,283 B1
(45) Date of Patent: Sep. 21, 2004

(54) CHILD SEAT RESTRAINING DEVICE AND METHOD

(76) Inventor: Victor A. Sipos, 10868 Glengarry La., Dublin, CA (US) 94568

( * ) Notice: Subject to any disclaimer, the term of this patent is extended or adjusted under 35 U.S.C. 154(b) by 0 days.

(21) Appl. No.: 10/037,493

(22) Filed: Jan. 3, 2002

(51) Int. Cl.[7] .................................. A47C 1/08
(52) U.S. Cl. ................................. 297/256.12
(58) Field of Search ............ 297/256.12, 256.16, 297/256.1, 250.1, 344.26, 344.24, 344.22, 344.21

(56) References Cited

U.S. PATENT DOCUMENTS

| | | | |
|---|---|---|---|
| 2,865,427 A | 12/1958 | Garfield | |
| 3,718,365 A | * 2/1973 | Gibson | |
| 4,762,364 A | 8/1988 | Young | 297/250 |
| 4,936,629 A | 6/1990 | Young | 297/250 |
| 4,971,392 A | 11/1990 | Young | 297/250 |
| 5,466,044 A | 11/1995 | Barley et al. | 297/252 |
| 5,487,588 A | 1/1996 | Burleigh et al. | 297/253 |
| 5,524,964 A | 6/1996 | Weimersheimer | 297/256.12 |
| 5,685,603 A | 11/1997 | Lane, Jr. | 297/216.11 |
| 5,971,479 A | 10/1999 | Jacquemot et al. | 297/256.14 |
| 6,024,398 A | * 2/2000 | Horton et al. | |
| 6,158,807 A | 12/2000 | Hampton | 297/256.1 |
| 6,193,310 B1 | * 2/2001 | Batalaris et al. | |
| 6,241,314 B1 | 6/2001 | Pufall | 297/256.12 |
| 6,283,545 B1 | 9/2001 | Ernst | 297/256.16 |
| 6,431,647 B2 | * 8/2002 | Yamazaki | |
| 6,572,189 B1 | * 6/2003 | Blaymore | |

* cited by examiner

*Primary Examiner*—Milton Nelson, Jr.
(74) *Attorney, Agent, or Firm*—Law Office of Marc D. Machtinger, Ltd.

(57) ABSTRACT

A child seat restraining device is disclosed having a stationary base with a securing mechanism for securing the base to a vehicle seat. A mobile platform is movably attached to the base and is selectively movable in a plane substantially parallel with respect to the stationary base between a first ready position and a second loading position. Optionally, the mobile platform is rotatable with respect to the base. A locking mechanism is provided for releasably locking the mobile platform into the ready position, and a child seat securing apparatus is provided to removably secure the child seat to the mobile platform. In one embodiment, a rotating platform is mounted to the mobile platform and the child seat is secured to the rotating platform. Alternatively, a rotating platform is mounted between the base and mobile platform, and the child seat is secured to the mobile platform. Optionally, integral lips secure the platforms to one another, and a convenient handle is formed in the mobile platform. In further alternate embodiments, the upper-most platform of the device is either a child seat base or a child seating member, optionally removably mounted. The device allows for convenient loading and unloading of a child or child seat into and out of the center position of a vehicle seat.

68 Claims, 13 Drawing Sheets

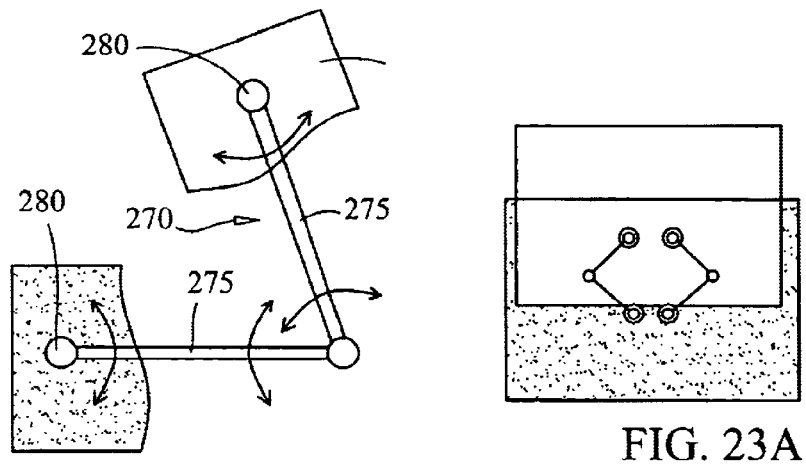
FIG. 22
FIG. 23A
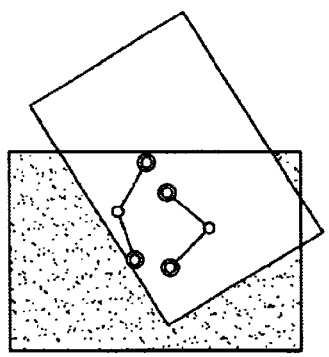
FIG. 23B
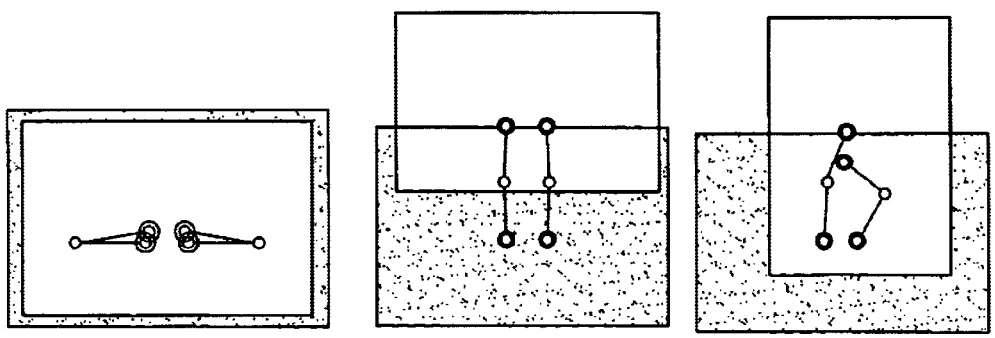
FIG. 23C  FIG. 23D  FIG. 23E

CHILD SEAT RESTRAINING DEVICE AND METHOD

TECHNICAL FILED

The present invention relates to child seat restraining devices, and more specifically child seat restraining devices for central mounting on a vehicle seat which allow for convenient loading and unloading, and a method of making the same.

BACKGROUND OF THE INVENTION

Child car seats are required in almost all states for infants and small children traveling in vehicles on public roads. Numerous organizations specializing in child safety strongly recommend that the child car seat be placed in the center position of a vehicle's rear seat. Placement in the center position is believed to provide the most safety for infants and children, especially when the vehicle is involved in a side collision. However, parents and caretakers often find it difficult and physically straining to remove a child car seat or to remove a child from the center position of the rear seat.

Obtaining access to the car seat or the child often requires the parent to awkwardly position herself inside the vehicle. Because the space in the rear seat is limited, this awkward positioning often requires the parent to strain while lifting the child or car seat. This strain can result in injury or inconvenience to both the parent and the child being removed.

Several attempts have been made to address some of the foregoing problems. For example, U.S. Pat. No. 6,283,545 issued to Ernst on Sep. 4, 2001 discloses an infant carrier loading device. A slide member is placed on the vehicle seat adjacent a base for a child car seat. A child carrier can be loaded onto the base via sliding over the slide member. Such a method of loading a child car seat has several disadvantages. For example, the slide member takes up space on the vehicle seat, or must be removed and stored elsewhere, and the mechanism can only be used with child car seats specifically designed for this configuration.

U.S. Pat. No. 6,158,807 issued to Hampton on Dec. 12, 2000 discloses another form of infant restraining seat. The seat slides along a pivotal base member such that the seat can be moved forward in the vehicle and pivoted toward a door. Numerous problems exist with respect to this configuration. As above, only a child car seat specifically designed for this purpose can be utilized; conventional car seats cannot interface with this system. Additionally, the need to move the seat forward in the vehicle prior to pivoting the base member toward the door can be problematic when limited room is available in the rear seat of a vehicle. Furthermore, the seat cannot pivot with respect to the base member, and thus, only a single position is available for loading and unloading. Finally, failure of a securing means could allow the child car seat to thrust forward along the track on the base member in the event of an accident.

Therefore, it would be advantageous to provide a child seat restraining device which does not occupy additional seat space, does not require forward motion in the vehicle, offers greater convenience to parents and caretakers when loading and unloading a child or a child car seat from the center position in the rear seat of a vehicle, reduces relative motion between elements, and is optionally adapted to function with substantially any commercially available child car seat without the need for a specially adapted car seat.

SUMMARY

In view of the deficiencies described above, it is an object of the present invention to provide a child seat restraining device which is of greater convenience and utility to those loading and unloading children or child car seats into or from the center position of the rear seat in a vehicle.

In accordance with the above objectives, the present invention is a child seat restraining device which provides convenience and utility to parents and caretakers. The device of the present invention is provided to be mounted in the center position of the rear seat of a vehicle. The device includes a stationary base having a bottom side, a top side, and a securing mechanism to secure the base to the vehicle seat. The base can be secured to the vehicle seat via a conventional vehicle safety belt, or via base mounting tethers which attach to anchors which are pre-installed in recently manufactured vehicles. Some vehicles have upper and lower anchors installed which receive upper and lower base mounting tethers. Newly manufactured vehicles are required to have anchors installed in the vehicle seat to engage tethers mounted on child seats as part of the Lower Anchors and Tethers for Children ("LATCH") system. A LATCH-compliant vehicle can receive side mounted base mounting tethers.

A mobile platform is movably attached to the base in such a manner that the mobile platform can be moved laterally toward one of the vehicle doors for loading and unloading. In one embodiment, the mobile platform can be moved only laterally toward the door with respect to the base. In another embodiment, the mobile platform is additionally rotatable with respect to the base and optionally capable of limited forward motion. A locking mechanism locks the mobile platform into place on the base in a secure manner, and can be released so that the mobile platform can be moved.

In one embodiment, a child seat is secured directly to the mobile platform. In another embodiment, the child seat is attached to a rotating platform which is rotatably mounted on the mobile platform to provide additional range of motion. Alternatively, the rotating platform is mounted between the base and the mobile platform, and the child seat is mounted to the mobile platform. In either embodiment, several modes of usage are present. Infant and child car seats are made in various manners. The terms "infant seat," "child seat," "car seat," and "child car seat" are used interchangeably herein to indicate any seat for holding a child or infant in a vehicle. Some such seats are designed to be carriers in addition to car seats. Some car seats have two components, a base to remain in a vehicle, and a carrier which is detachable from the base. Other car seats have only a single component, that being a carrier or seat. The terms "infant seat," "child seat," "car seat," and "child car seat" are used herein to indicate any one of these devices, either in whole or in part. The device of the present invention can receive the base of a commercially available two-piece car seat, or a carrier or independent seat designed to fit directly on a vehicle seat. Alternatively, a specially designed seat or seat and base combination can be used to meet specifications of the present device. In order to distinguish between elements, as used herein, the term "child seat base" means the base component of a two-piece child seat having a base and a removable child seating member. The term "child seating member" means a carrier or component directly into which a child sits or lies in a two-piece child seat, or the entire child seat in a one-piece child seat device. A child seating member may be an infant carrier or an upright seat for an older child.

In the embodiment which includes a rotating platform, the device can be used most conveniently. A child or child seat can be removed from the device while positioned near the door of the vehicle. Ideally, the rotating platform can be positioned such that the child's feet are toward the door, or optionally, away from the door. Preferably, the child seat can either be rotated to the desired rear-facing or forward-facing position, and then the mobile platform can be pushed in toward the center of the seat and locked into place. Alternatively, the mobile platform can be pushed toward the center of the vehicle seat first, and then the rotating platform can be rotated into the desired position.

Security rails are preferably provided to interlock the various platforms and prevent undesirable movement therebetween in the event of an accident. Various configurations are contemplated, including a security rail extending from the stationary base to engage either or both of the mobile platform and the rotating platform. Optionally, a security rail extends from the mobile platform to engage the rotating platform, or vice versa.

The car seat is attached to either the mobile platform or the rotating platform in the various embodiments of the present invention. Any attachment means is contemplated, including a safety belt type fastener, tethers and anchors, or additional elements or suitable mounting equipment above or on the upper-most platform.

In an additional embodiment of the present invention, the upper-most platform of the device is a child seat base, and is optionally removably mounted. Alternatively, the upper-most platform is integral with or fixedly attached to a child seat base. As used herein, the term "integral with" refers to a component which is either formed of the same component or fixedly attached. In this embodiment, a child seat base includes mounting means for movably mounting the base to either the stationary platform or the middle platform. If the child seat base serves as the mobile platform, it is mounted in such a manner that it is capable of lateral displacement. Alternatively, if the child seat base serves as the rotating platform, it is rotatably mounted. In one mode of this embodiment, the upper-most platform is designed as a child seat base capable of receiving a child seating member, either specially configured to receive a specific child seating member, or generally configured for receiving substantially any commercially available child seating member.

In a further embodiment of the present invention, the upper-most platform of the device is a child seating member. Alternatively, the upper-most platform is integral with or fixedly attached to a child seating member. As used herein, the term "integral with" refers to a component which is either formed of the same component or fixedly attached, and thus shall encompass the platform being the child seating member, or the platform being fixedly attached to the child seating member. In this embodiment, a child seating member includes mounting means for movably mounting the child seating member to either the stationary platform or the middle platform. If the child seating member serves as the mobile platform, it is mounted in such a manner that it is capable of lateral displacement. Alternatively, if the child seating member serves as the rotating platform, it is rotatably mounted.

A method for manufacturing the device of the present invention by providing the various components described in detail below is also disclosed.

Other features and advantages of the invention will be apparent from the following detailed description taken in conjunction with the following drawings.

BRIEF DESCRIPTION OF THE DRAWINGS

FIG. 22 is a broken away view showing a pivotal arm of one embodiment of the present invention.

FIG. 23A is a top view showing one position of the mobile platform in one embodiment of the present invention relative to the stationary platform using pivotal arms.

FIG. 23B is a top view showing another position of the mobile platform in one embodiment of the present invention relative to the stationary platform using pivotal arms.

FIG. 23C is a top view showing another position of the mobile platform in one embodiment of the present invention relative to the stationary platform using pivotal arms.

FIG. 23D is a top view showing another position of the mobile platform in one embodiment of the present invention relative to the stationary platform using pivotal arms.

FIG. 23E is a top view showing another position of the mobile platform in one embodiment of the present invention relative to the stationary platform using pivotal arms.

DETAILED DESCRIPTION

Figure 1:
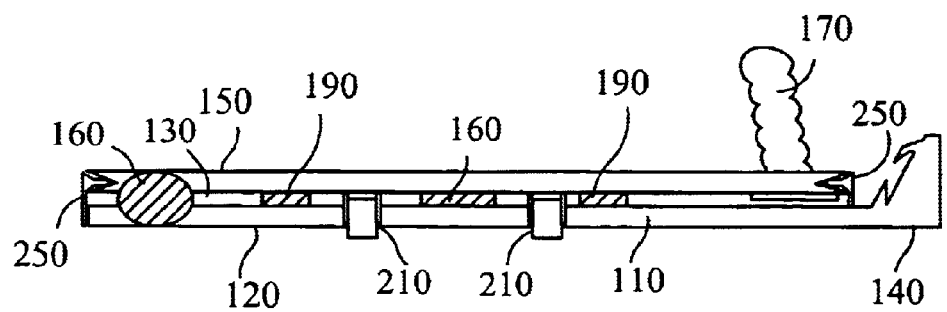
FIG. 1 is a side view of one embodiment of the device of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
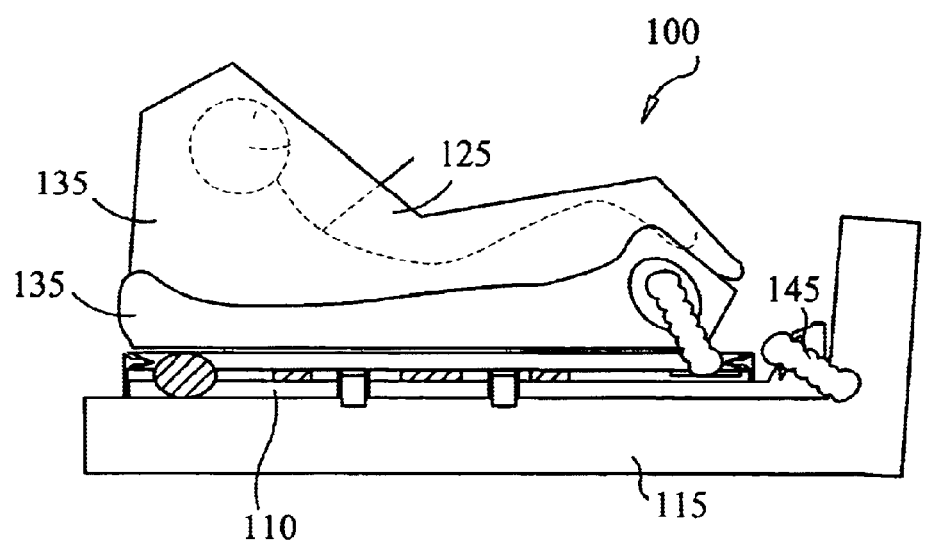
FIG. 2 is a side view of one embodiment of the device of the present invention showing a car seat installed thereon.
Figure 4:
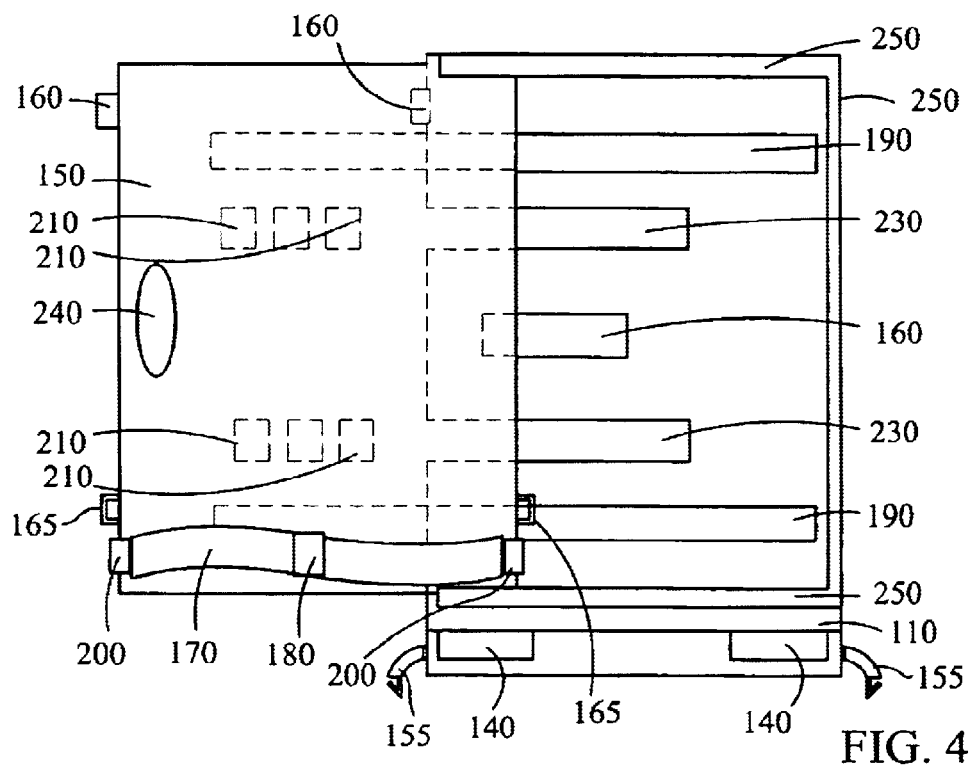
FIG. 4 is a top view of one embodiment of the device of the present invention showing the mobile platform in an extended position.
Figure 5:
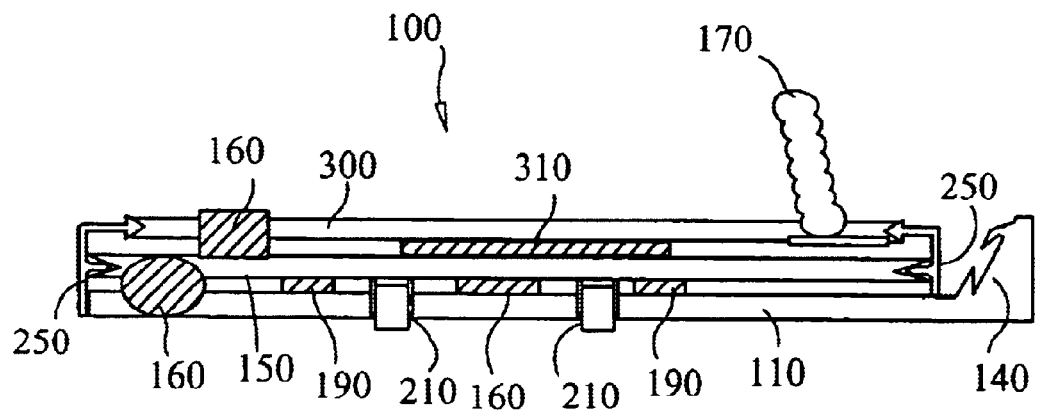
FIG. 5 is a side view of another embodiment of the device of the present invention.
Figure 6:
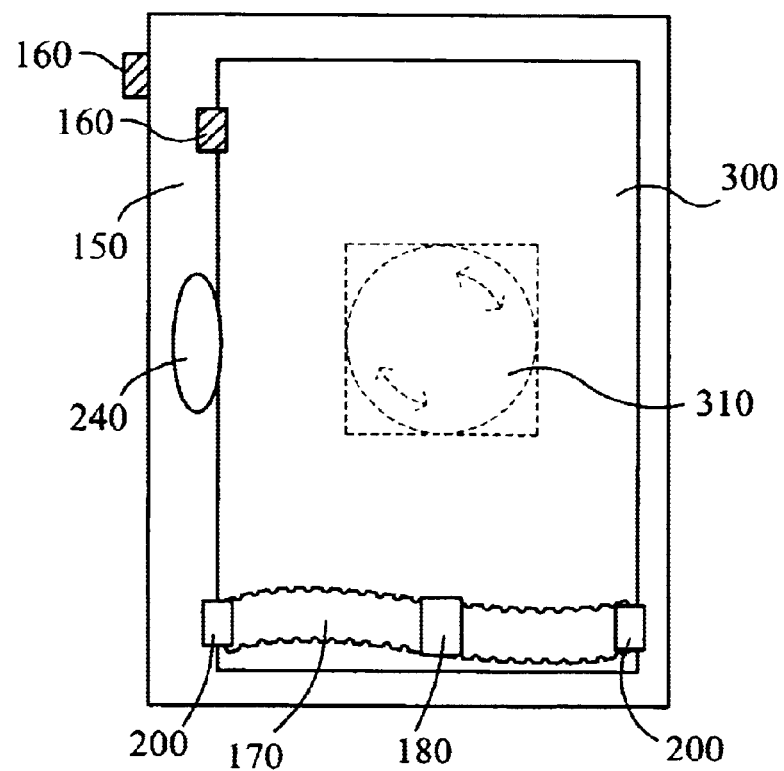
FIG. 6 is a top view of an embodiment of the device of the present invention showing the mobile platform and rotating platform in locked positions.
Figure 9:
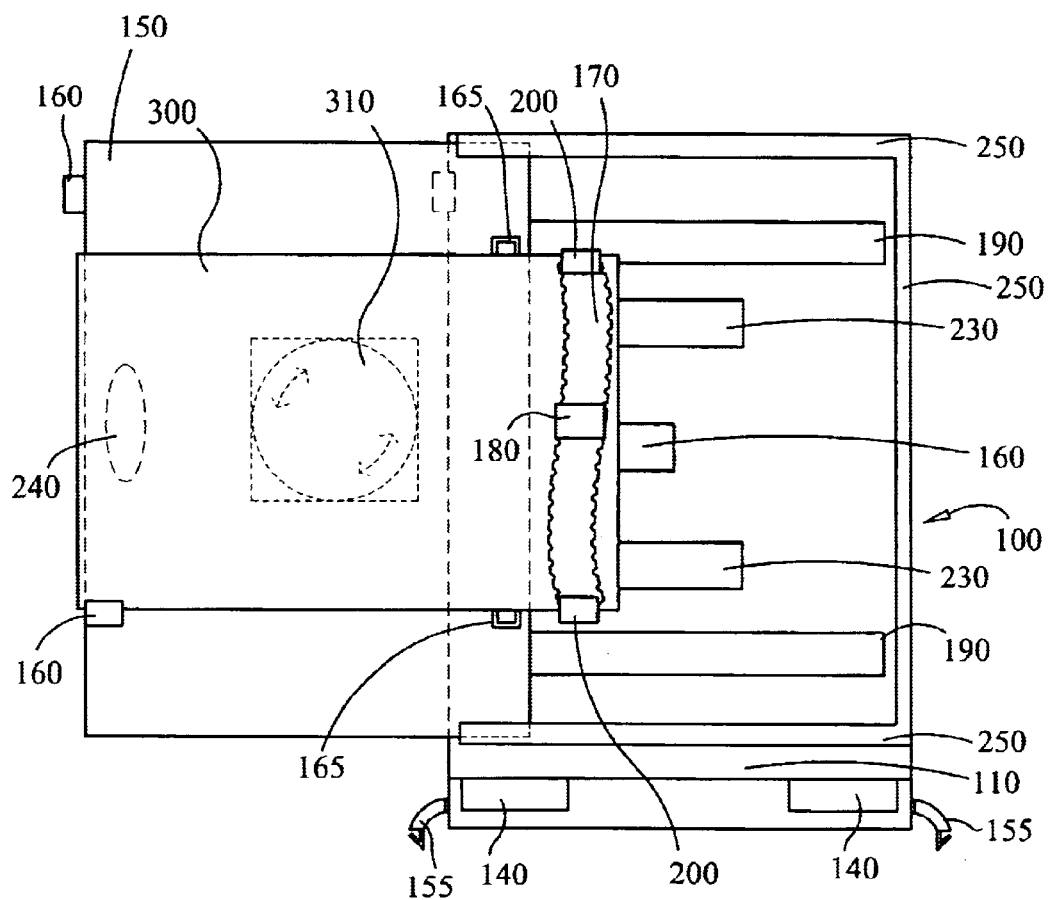
FIG. 9 is a top view of an embodiment of the device of the present invention showing the rotating platform in a rotated position and the mobile platform in an extended position.
Figure 10:
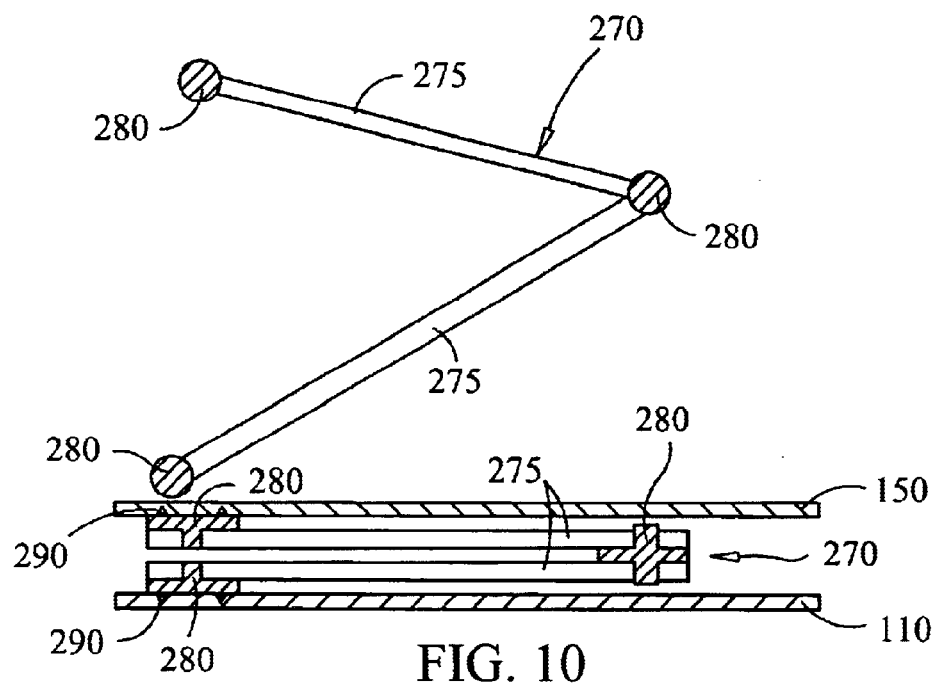
FIG. 10 is a top view of pivoting arms of one embodiment of the present invention.
Figure 11:
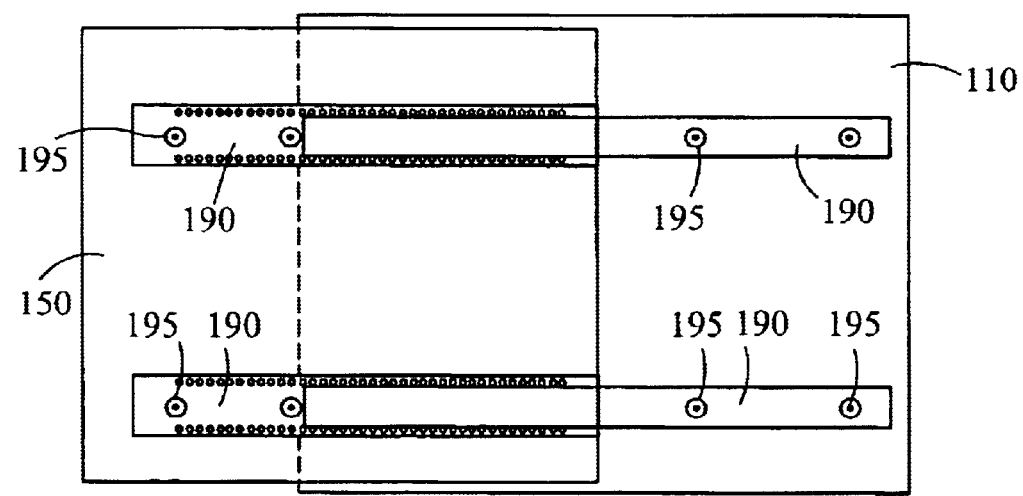
FIG. 11 is a top view showing extension rails of one embodiment of the present invention.
Figure 12:
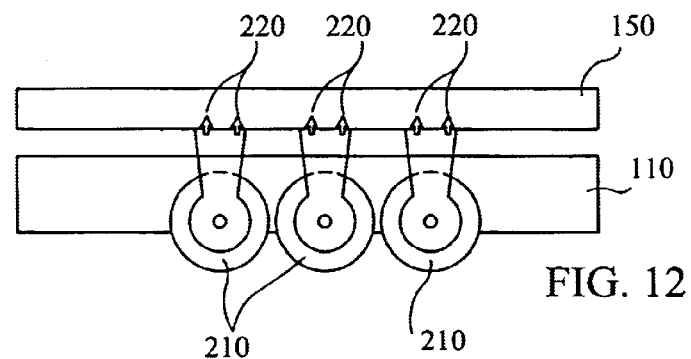
FIG. 12 is a sectional view of the wheels of one embodiment of the present invention.
Figure 13:
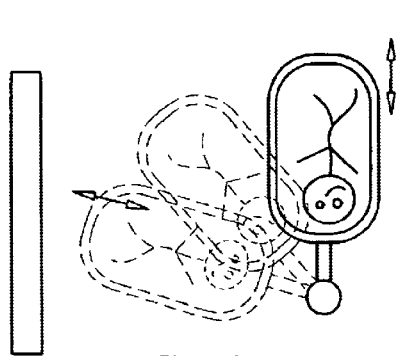
FIG. 13 is a top conceptual view of a prior art device.
Figure 19:
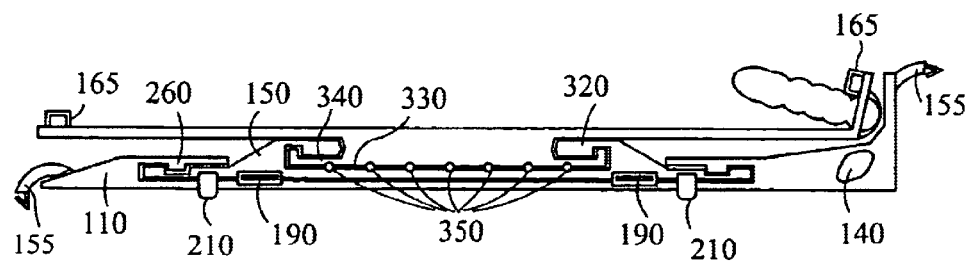
FIG. 19 is a cross-sectional view of another embodiment of the device of the present invention.

One embodiment of a child seat restraining device 100 of the present invention is illustrated in FIGS. 1 and 2. The device 100 comprises a stationary base 110 having a bottom side 120, a top side 130, and securing means 140. Securing means 140 enables the base 110 to be secured to a vehicle seat 115. Any means of securing base 110 to a vehicle seat 115 is contemplated, including but not limited to a receiving member configured to receive a portion of a vehicle seat belt 145, or one or more base mounting tethers 155 mounted to the stationary base 110. Such tethers 155 may be upper and lower tethers 155, as shown in FIG. 19, which can be mounted to upper and lower anchors which have been pre-installed in a vehicle. Alternatively, or additionally, such tethers 155 may be a pair of side mounted base mounting tethers 155 as shown in FIGS. 4 and 9, in order to be compatible with LATCH-compliant vehicles.

Figure 3:
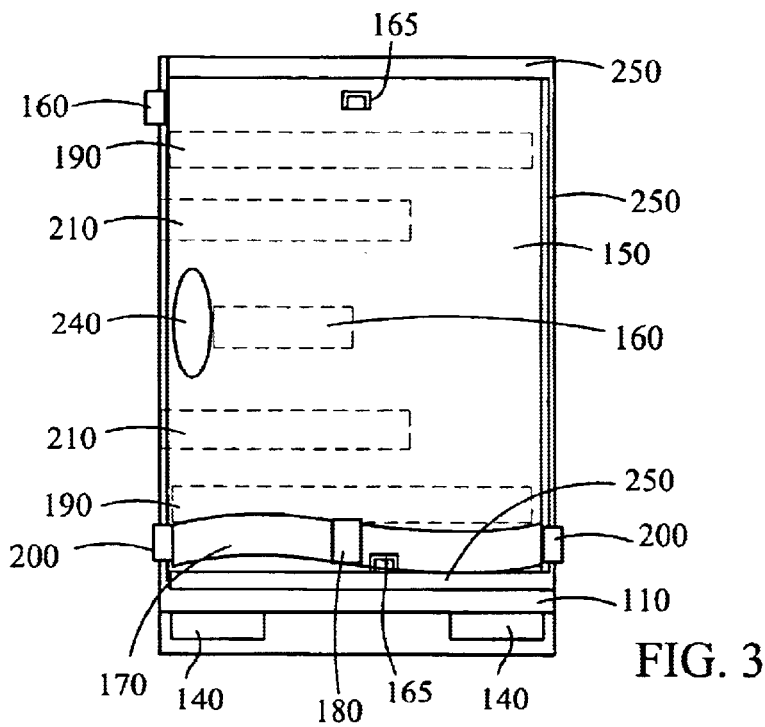
FIG. 3 is a top view of one embodiment of the device of the present invention in a locked position.

A mobile platform 150 movably attached to the base 110 wherein the mobile platform 150 is selectively movable in a plane substantially parallel with respect to the stationary base 110 between a first ready position and a second loading position. The mobile platform 150 is in the ready position when it is positioned above the stationary base 110, as shown in FIG. 3. The mobile platform 150 is in the loading position when it is laterally displaced from the stationary base 10, as shown in FIG. 4. As used herein, the term "platform" is to be construed broadly to include any hardware serving the functions as described, and is not limited to flat or solid configuration.

A locking mechanism 160 for releasably locking the mobile platform 150 into the ready position comprises any suitable locking means.

A child seat securing apparatus 170 is provided in order to secure a child seat 135 removably to the mobile platform 150. The child seat securing apparatus can be any suitable means for securing the child seat 135 to the mobile platform 150 including but not limited to a belt 170 having a buckle 180 and mounts 200, anchors 165 for securing one or more tethers, or additional elements or platforms mounted on the mobile platform 150 having suitable mounting equipment. Such anchors 165 may be upper and lower anchors 165, as shown in FIG. 3, which can be mounted to upper and lower child seat tethers. Alternatively, or additionally, such anchors 165 may be side mounted as shown in FIG. 4, in order to be compatible with LATCH-compliant child seats. In a preferred embodiment, the mobile platform 150 is a child seat base 136 or is integral therewith, and the child seat securing apparatus 170 is any suitable mechanism for securing a child seating member to a child seat base 136.

The mobile platform 150 can be displaced laterally from the base 110 in a direction substantially parallel to a seat back of a vehicle, and wherein the loading position is closer to a vehicle door than the ready position when the device 100 is installed substantially in the center of a vehicle seat 115, allowing a child 125 to be conveniently loaded into or unloaded from a child seat 135.

The bottom side 120 of stationary base 110 preferably has a non-slip surface. This surface is either integral with the base 110 or adhered thereto. The non-slip surface is a surface which increases the coefficient of friction between the base 110 and a vehicle seat 115 over that which would be between the other surfaces of the base 110 and the seat 115, or otherwise engages vehicle seat 115, and tends to reduce slippage between the base 110 and the vehicle seat 115. The non-slip surface is optionally a configuration of the bottom surface 120 of stationary base 110 wherein relatively sharp edge portions of bottom surface 120 tend to dig into or otherwise engage vehicle seat 115 to reduce motion therebetween.

In a preferred embodiment, the mobile platform 150 is slidably mounted on the stationary base 110 such that the mobile platform 150 can slide laterally with respect to the base 110 toward a door of the vehicle. Any suitable means for slidably mounting mobile platform 150 is contemplated. In one preferred embodiment, the slidable mounting comprises extension rails 190 wherein at least one extension rail member 190 is fixedly mounted to the stationary base 110 and at least one extension rail member 190 is fixedly mounted to the mobile platform 150, the extension rail members 190 engaging one another wherein the mobile platform 150 is laterally movable with respect to the stationary base 110. Preferably, vertical motion of the mobile platform 150 with respect to the stationary base 110 is substantially prevented by the engagement of the extension rails 190. Extension rails 190 preferably, though not necessarily, include a catches or another suitable configuration to engage one another to prevent complete separation of the mobile platform 150 from the stationary base 110 via mere lateral displacement. Extension rails 190 are mounted to base 110 and mobile platform 150 via rail mounts 195, and preferably use ball-bearings to facilitate smooth sliding with respect to one another.

In another preferred embodiment, the child seat restraining device 100 further comprises support wheels 210 mounted to the mobile platform 150 via wheel mounts 220 and extending toward a vehicle seat 115 when the device 100 is mounted on such a seat. Preferably, the stationary base 110 further comprises grooves 230 cut in alignment with the wheels 210 to allow the wheels 210 to contact such a vehicle seat 115 through a range of positions of the mobile platform 150 between the ready position and the loading position, wherein a portion of the weight of the mobile platform 150 and any load bearing upon the mobile platform 150 is supported by such a vehicle seat 115 via the wheels 210. Alternatively, such grooves 230 are omitted, and wheels 210 are optionally spring-loaded and adjust to different heights to accommodate base 110 and the vehicles seat.

Ideally, the mobile platform 150 comprises a handle 240 for manipulation of the mobile platform 150 to allow a parent to easily manipulate the mobile platform 150 into a desired position.

In another preferred embodiment of the invention, at least one security rail 250 extends from the base 110 to help secure the mobile platform 150 into place when in the ready position. The security rail 250 is preferably on one, two, or three sides of the base 110, and engages the mobile platform 150 by any suitable means. In one embodiment, the rail 250 engages the platform 150 by overlapping it. In another embodiment, a lip on the rail 250 engages a groove in the platform 150. This rail 250 reduces displacement of the mobile platform 150 in several horizontal directions, and in the vertical directions.

Figure 20:
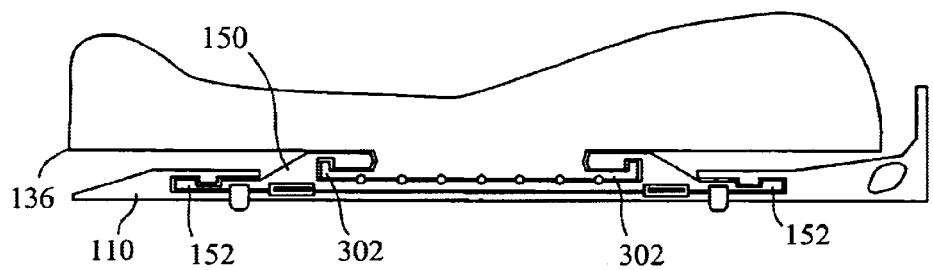
FIG. 20 is a cross-sectional view of another embodiment of the device of the present invention.
Figure 21:
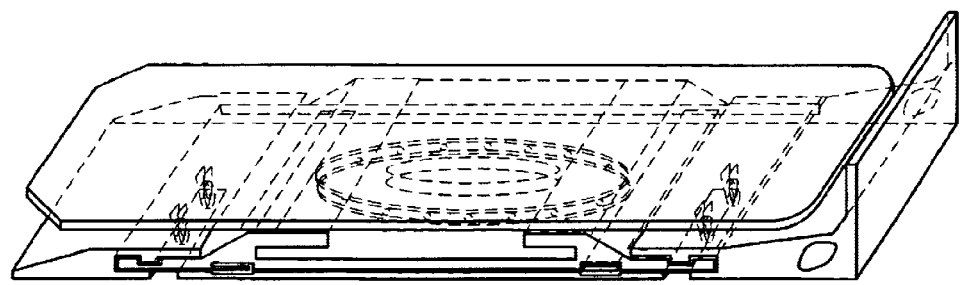
FIG. 21 is a perspective view of another embodiment of the device of the present invention.
Figure 24:
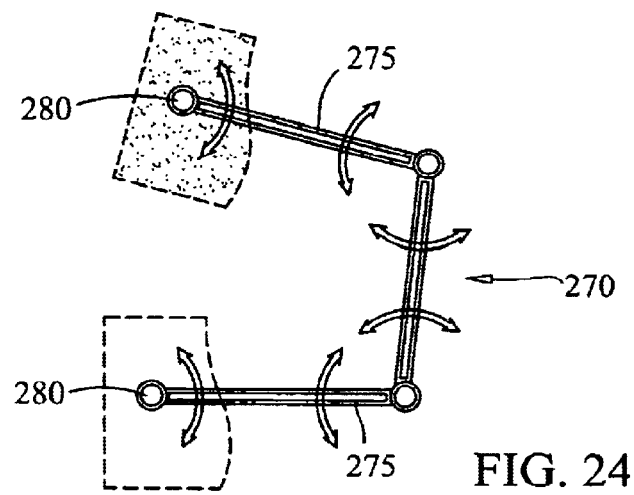
FIG. 24 is a broken away view showing a pivotal arm of another embodiment of the present invention.
Figure 25A:
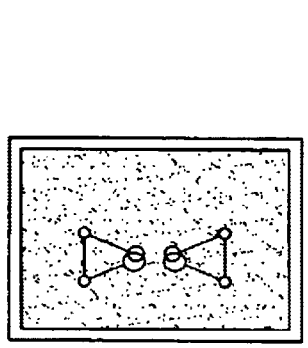
FIG. 25A is a top view showing one position of the mobile platform in another embodiment of the present invention relative to the stationary platform using pivotal arms.
Figure 25B:
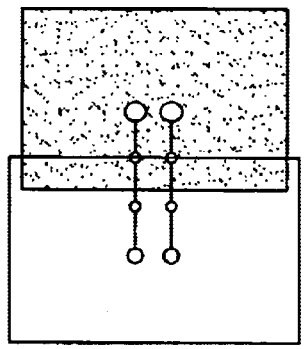
FIG. 25B is a top view showing another position of the mobile platform in another embodiment of the present invention relative to the stationary platform using pivotal arms.
Figure 25C:
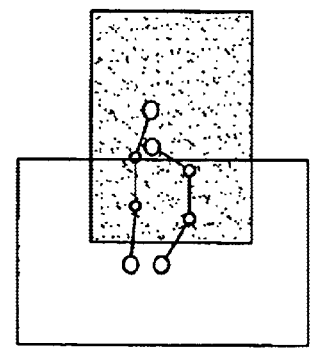
FIG. 25C is a top view showing another position of the mobile platform in another embodiment of the present invention relative to the stationary platform using pivotal arms.

In a further preferred embodiment, referring to FIGS. 19–21, stationary base 110 includes a lip 260 which may be integral with the base 110. Lip 260 engages or interlocks with a portion 152 of the mobile platform 150, such as an outer portion 152 or a flanged portion 152 of the mobile platform 150 to reduce relative vertical displacement between the stationary base 110 and the mobile platform 150. In one embodiment, lip 260 extends from base 110, as shown in FIG. 19, and may serve as a security rail 250.

In another preferred embodiment of the invention, the mobile platform 150 is rotatable with respect to the stationary base 110. This can be accomplished using any suitable means for rotatably mounting a platform. In a preferred embodiment, the mounting is accomplished via one or more rotating arms 270. Such arms 270 have at least two segments 275 which are pivotally connected with respect to each other at inner ends, one of the segments 275 being pivotally connected at an outer end to the mobile platform 150 or a mounting thereon, the other segment 275 being pivotally connected at an outer end to the stationary base 110 or a mounting thereon, wherein the mobile platform 150 is rotatably movable and laterally movable with respect to the stationary base 110. The pivotal connection between the segments 275 may comprise a single pivot point 280. Alternatively, one or more additional segments 275 are pivotally connected between the two segments 275, which is intended to be within the meaning of the two segments being "pivotally connected with respect to each other." Pivot points 280 at the outer ends of segments 275 are preferably mounted to the respective members via affixing devices 290. FIGS. 22 and 23A–23E show operation of rotating arms 270. A single arm 270 can be used as shown in FIG. 22, however, ideally, two such rotating arms 270 are mounted as shown in FIGS. 23A–23E. FIGS. 24 and 25A–25C show rotating arms 270 having three segments 275.

Referring now to FIGS. 5–9, et al., another preferred embodiment of the invention includes middle and upper platforms mounted above stationary base 110. In one such embodiment, the upper platform is a rotating platform 300 which is rotatably mounted to the middle platform, in this case the mobile platform 150, and comprises a child seat securing apparatus 170 as described above with reference to the mobile platform 150, wherein a child seat 135 can be removably secured to the rotating platform 300 via any suitable means such as a belt 170, one or more anchors 165 for securing one or more child seat tethers, or additional elements or platforms mounted on the rotating platform 300 having suitable mounting equipment. Such anchors 165 may be upper and lower anchors 165, as shown in FIG. 19, which can be mounted to upper and lower child seat tethers. Alternatively, or additionally, such anchors 165 may be side mounted as shown in FIG. 9, in order to be compatible with LATCH-compliant child seats.

Figure 7:
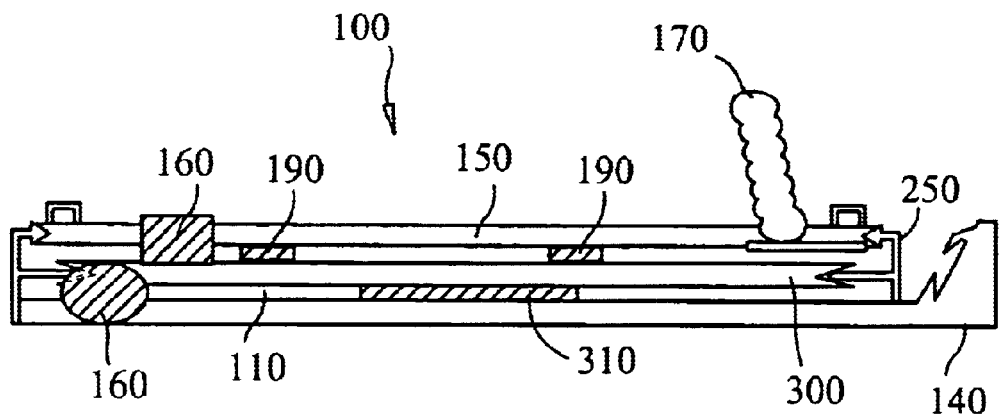
FIG. 7 is a side view of another embodiment of the present invention.
Figure 8:
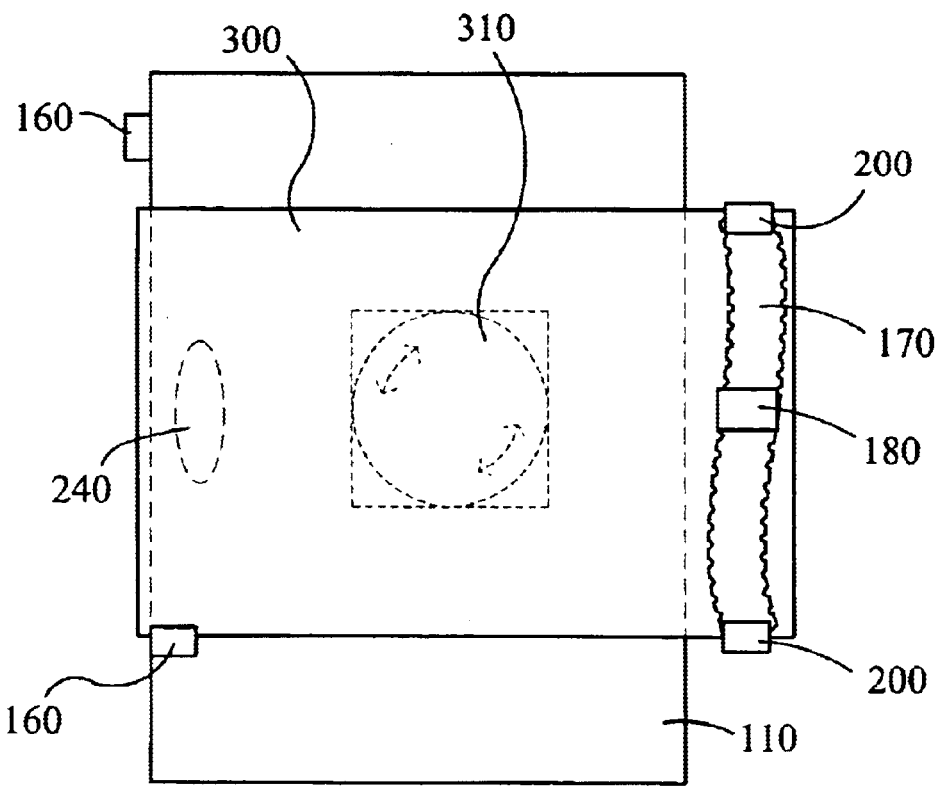
FIG. 8 is a top view of an embodiment of the device of the present invention showing the rotating platform in a rotated position.

Alternatively, as shown in FIG. 7, the upper platform is the mobile platform 150, and the middle platform is the rotating platform 300. In this embodiment, the mobile platform 150 comprises the child seat securing apparatus 170 as described above, wherein a child seat 135 can be removably secured to the mobile platform 300 via any suitable means.

In either embodiment, the upper platform is optionally a child seat base 136, or is integral therewith, and the child seat securing apparatus 170 is any suitable mechanism for securing a child seating member to a child seat base 136. Such a child seat base 136 and upper platform combination is optionally removably mounted to said device.

Locking mechanisms 160 can either work to lock all three of the base 110, mobile platform 150, or rotating platform 300 together, or can work independently. For example, a first locking mechanism 160 can be used to releasably lock one or both of the mobile platform 150 or the rotating platform 300 with respect to the base 110. A second locking mechanism 160 is optionally employed to releasably lock the mobile platform 150 with respect to the rotating platform 300 independently of the first locking mechanism 160. Suitable locking mechanisms 160 are described further below.

In this embodiment, mobile platform 150 can be displaced laterally from the base 110 in a direction substantially parallel to a seat back of a vehicle, wherein the loading position is closer to a vehicle door than the ready position when the device 100 is installed substantially in the center of a vehicle seat 115, and wherein the rotating platform 300 can be rotated with respect to the mobile platform 150 to rotate a child seat 135 attached to the device 100 into a desired position for convenience when loading, yet into a rear-facing or front-facing position when the mobile platform 150 is in the ready position.

Rotating platform 300 is rotatably mounted to either mobile platform 150 or base 110 via any suitable means, preferably a lazy Susan mechanism 310. Rotating platform 300 can be rotated in either the ready position or in the loading position, preferably in both positions.

A security rail 250 extending from either the base 110 or middle platform preferably engages a portion of the upper platform when locked to secure and reduce relative movement therebetween when engaged. This security rail 250 is either integral with the security rail 250 securing the middle platform to the base, or independent thereof In another preferred embodiment, the base 110 or middle platform, whichever is positioned immediately below the rotating platform 300, further comprises an integral lip configuration 320 which forms a circular cavity having an interface surface 330 within the mobile platform 150 or base 110 and which overlaps a portion 302 such as an outer portion 302 or a flanged portion 302 of a base pedestal 340 of the rotating platform 300 to reduce relative vertical displacement between the rotating platform 300 and the middle platform or base 110. Preferably, rotational bearings such as ball-bearings 350 between the interface surface 330 and the base pedestal 340 of said rotating platform 300 facilitate smooth rotation of the rotating platform 300 with respect to the interface surface 330. As shown in FIGS. 19 and 20, the integral lips 260 and 320 can be utilized together in order to substantially prevent relative vertical displacement. In one embodiment, lip 260 extends from base 110, as shown in FIG. 19, and may serve as a security rail 250, and lip 320 extends from mobile platform 150, and may serve as a security rail 250.

Figure 14:
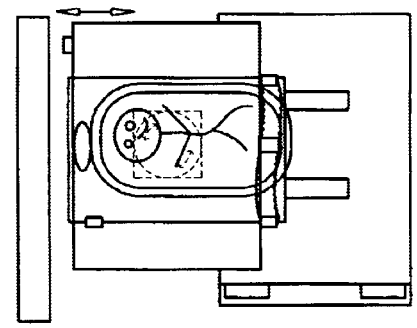
FIG. 14 is a top view of one embodiment of the present invention showing one orientation of the device in an extended position.
Figure 15:
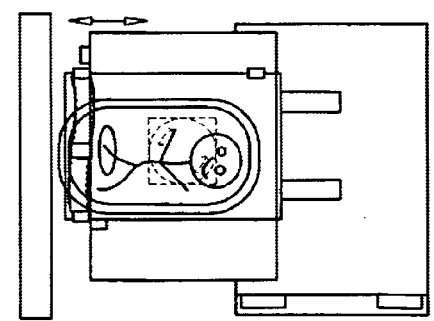
FIG. 15 is a top view of one embodiment of the present invention showing another orientation of the device in an extended position.

Preferably, the rotating platform 300 can be rotated in a manner such that a rear-facing side of a child seat 135 which faces a seat back when in a locked position can be rotated to face toward a loading door of a vehicle when the mobile platform 150 is in the loading position, as shown in FIG. 15, or a rear-facing side of a child seat 135 which faces a seat back when in a locked position can be rotated to face away from a loading door of a vehicle when the mobile platform 150 is in the loading position, as shown in FIG. 14. Ideally, the rotating platform 300 can be selectively rotated and positioned into either of two loading positions, a first one of said loading positions configured with a rear-facing end of a child seat 135 which faces a seat back when in a locked position rotated to face away from a loading door of a vehicle when the mobile platform 150 is in the loading position, as shown in FIG. 14, and a second one of said loading positions configured with the rear-facing end of a child seat 135 which faces a seat back when in a locked position rotated to face toward such a loading door of a vehicle when the mobile platform 150 is in the loading position, as shown in FIG. 15.

In any of the embodiments illustrated above, in preferred form, the mobile platform 150 is capable of lateral displacement without the need for any substantial movement in the forward direction relative to a vehicle seat back. Additionally, the mobile platform 150 is preferably movable into the loading position without the need for pivoting any platform of the device 100.

Figure 26:
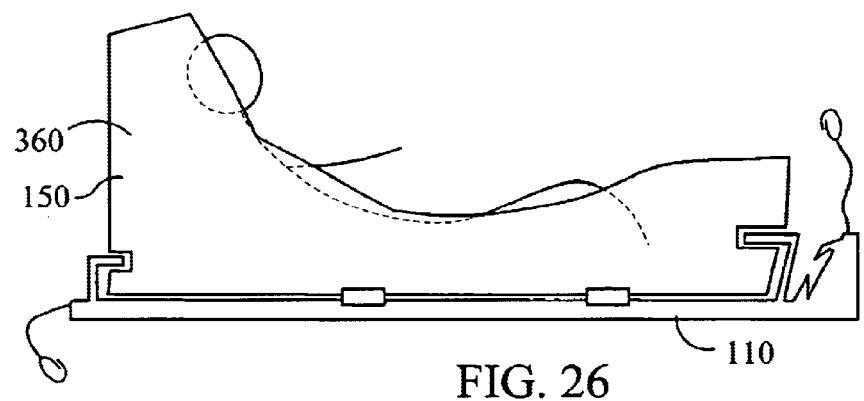
FIG. 26 is a cross-sectional view of another embodiment of the device of the present invention.
Figure 27:
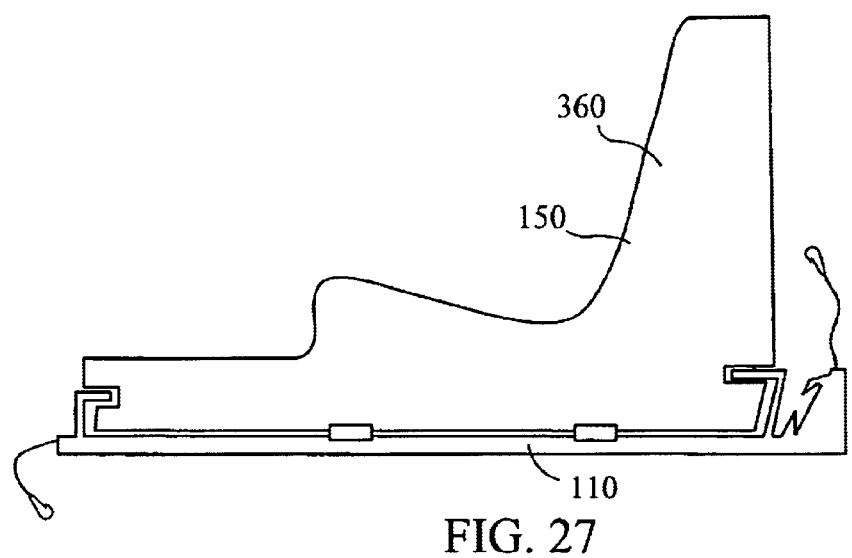
FIG. 27 is a cross-sectional view of another embodiment of the device of the present invention.
Figure 28:
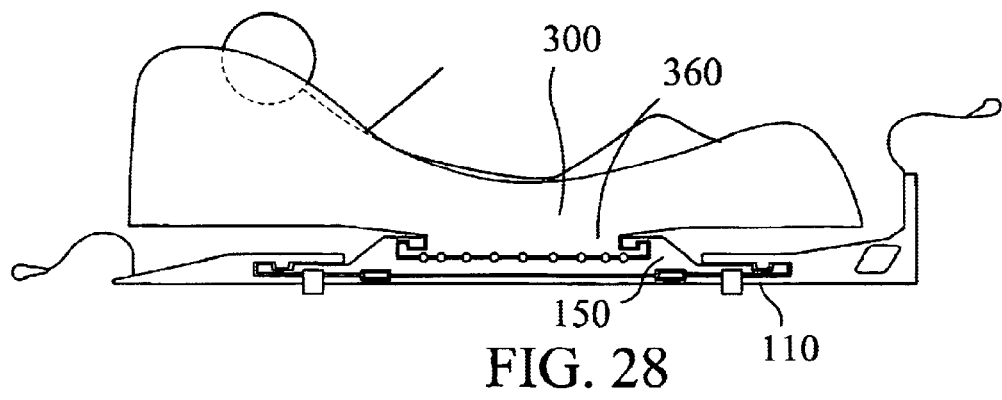
FIG. 28 is a cross-sectional view of another embodiment of the device of the present invention.
Figure 29:
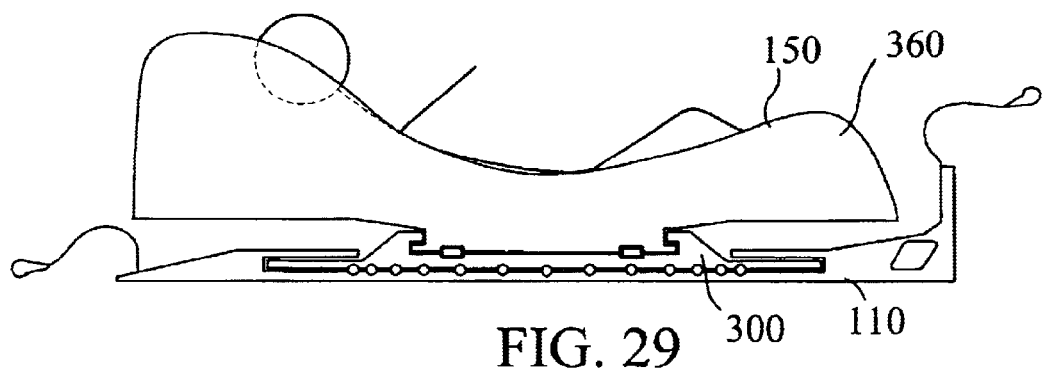
FIG. 29 is a cross-sectional view of another embodiment of the device of the present invention.
Figure 30:
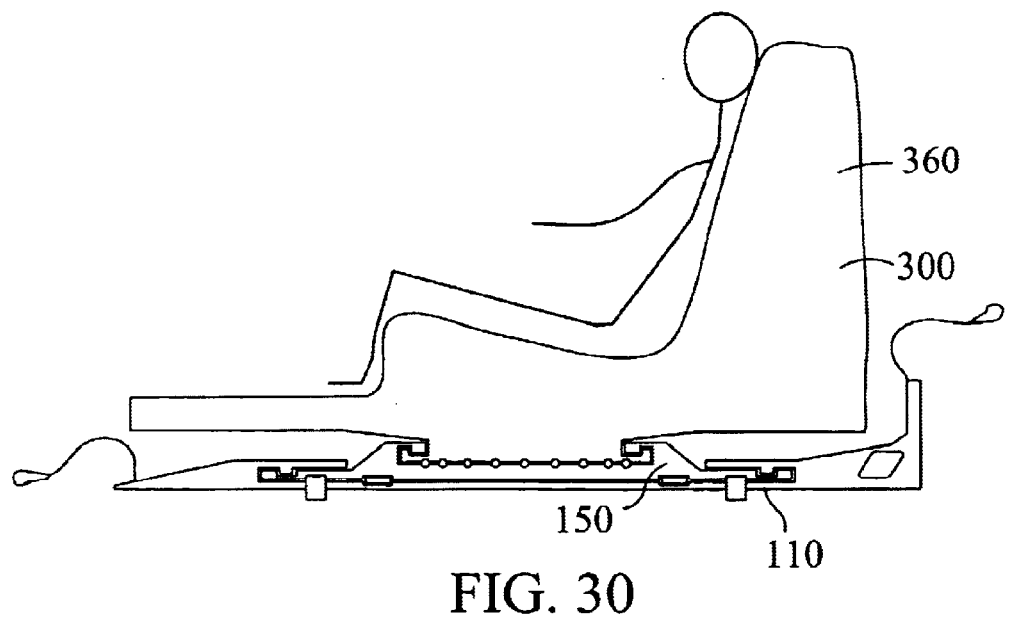
FIG. 30 is a cross-sectional view of another embodiment of the device of the present invention.

In yet another embodiment of the present invention, the upper-most platform of the device 100 is a child seating member 360. The upper-most platform is referred to herein as integral with the child seating member 360 meaning that it is either the child seating member 360 itself, or fixedly attached thereto. In the embodiment having only a mobile platform 150, the mobile platform 150 is integral with the child seating member 360, as shown in FIGS. 26 and 27. In the embodiment in which a rotating platform 300 is mounted above mobile platform 150, the rotating platform 300 is integral with the child seating member 360, as shown in FIGS. 28 and 30. In the embodiment in which the mobile platform 150 is mounted above the rotating platform 300, the mobile platform 150 is integral with the child seating member 360, as shown in FIG. 29. In any of the above, the child seating member 360 is optionally removably mounted to the device 100.

The present invention additionally provides a method for manufacturing a child seat restraining device 100 comprising the steps of providing a stationary base 110 having a bottom side 120 and a top side 130, providing a securing mechanism 140 to enable the stationary base 110 to be secured against a vehicle seat 115, providing a mobile platform 150 movably attached to the device 100, wherein the mobile platform 150 is selectively movable in a plane substantially parallel with respect to said stationary base 110 between a first ready position and a second loading position, providing a locking mechanism 160 for releasably locking the mobile platform 150 into the ready position, and providing a child seat securing apparatus 170 wherein a child seat 135 can be removably secured to said device 100, wherein said mobile platform 150 can be displaced laterally from said base 110 in a direction substantially parallel to a seat back of a vehicle, and wherein said loading position is closer to a vehicle door than said ready position when said device 100 is installed substantially in the center of a vehicle seat 115. The method optionally includes the step of rotatably mounting a rotating platform 300 to the mobile platform 150, wherein the step of providing a child seat securing apparatus 170 is performed by providing the securing mechanism 170 on the rotating platform 300. Alternatively, the method includes the step of rotatably mounting a rotating platform 300 between the mobile platform 150 and the stationary base 110, wherein the step of providing a child seat securing apparatus 170 is performed by providing the securing mechanism 170 on the mobile platform 150.

Figure 16:
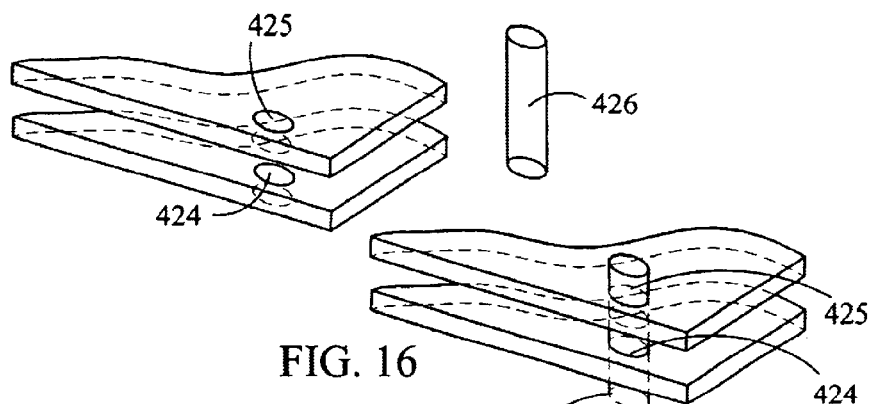
FIG. 16 is a perspective view showing one embodiment of a locking device of the present invention.
Figure 17:
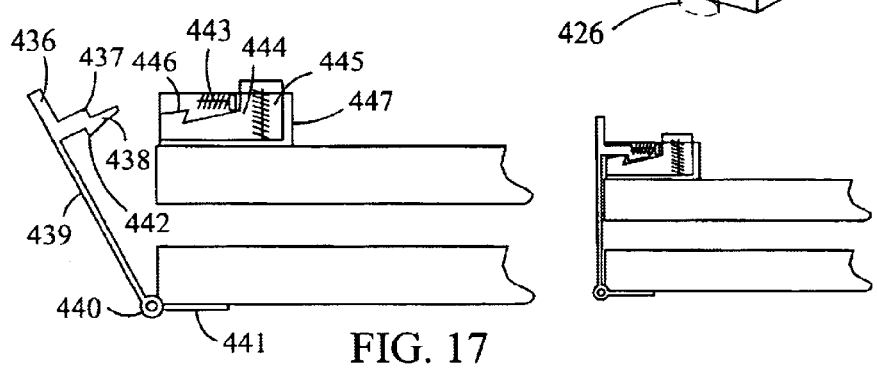
FIG. 17 is a side sectional view of another embodiment of a locking device of the present invention.
Figure 18:
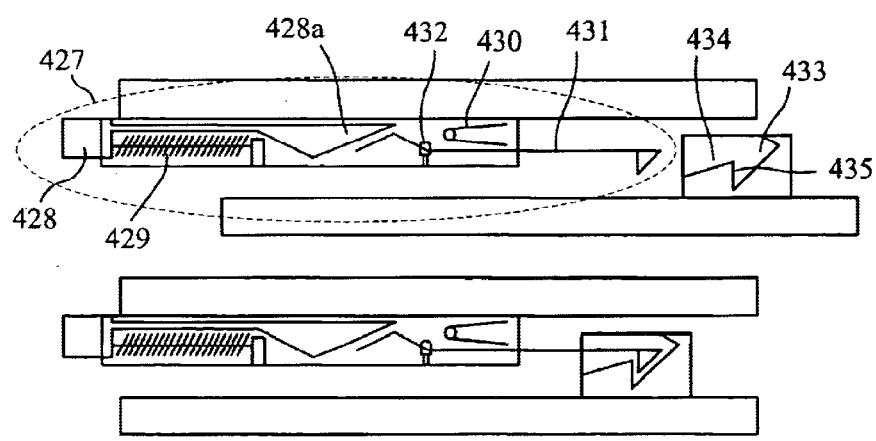
FIG. 18 is a side sectional view of another embodiment of a locking device of the present invention.

Any suitable locking mechanisms 160 are contemplated to be within the scope and spirit of the invention. Various suitable locking mechanisms 160 are preferably as follows, referring to FIGS. 16–18:

The device 100 includes locking devices 160 that when in a locked position prevents movement of mobile platform 150 relative to stationary base 110, movement of the rotating platform 300 relative to the mobile platform 150, and/or movement of rotating platform 300 relative to stationary base 110, or any or all of the above. The locking devices 160 can be designed to operate in numerous ways, including but not limited to by use of the following mechanisms:

1. Pin in slot. Holes 424, 425 are cut through the various platforms of the device 100 that are intended to be locked into place such that the holes 424, 425 are preferably of uniform shape. When in the desired locked position, the holes 424, 425 are substantially lined up with one another on a vertical axis. A pin 426 made of a strong and rigid material having a vertical cross section slightly smaller than the size of the holes 424, 425 so that the pin 426 can be vertically inserted through the holes in such a manner that when inserted, relative lateral movement between the platforms through which the pin 426 is inserted is substantially prevented. The platforms are locked by inserting the pin 426 through the various platforms that are intended to be locked.
2. Flip Latch. A latch arm 439 pivots on an attached pivot 440 relative to a latch affixing surface 441 such that the latch affixing surface 441 is affixed to a platform. The latch arm 439 has a handle 436 that permits the latch arm 439 to be manipulated. To lock the device, the latch arm 439 is pivoted so that the latch 438 slides into a button chamber 447 attached to another platform and the sloping lower side of the latch 438 compresses a button spring 445 by pressing on the sloping top side of the button 444 that is housed inside the button chamber 447. When fully inserted, the lower lip of the latch 442 extends beyond upper lip 446 of the sloping top side of the button 444 such that the latch 438 is locked behind the button 444 because the sloping lower side of the latch 438 is no longer compressing the button spring 445. When the latch 438 is fully inserted, a latch spring 443 is compressed and presses on the spring surface 437 that is affixed to the latch 438 and the latch arm 439. To unlock the device, the button 444 is pressed in such a manner that the button spring 445 is compressed, thereby moving the upper lip 446 of the top side of the button 444 below the lower lip of the latch 442 so that the pressure from the compressed latch spring 443 pressing on the spring surface 437 presses on the latch arm 439 such that the latch 438 exits the button chamber 447.
3. Sliding Latch. A latch chamber 427 is affixed to a platform such that on another platform a locking chamber 433 is affixed in such a manner than when in locked position the latch chamber 427 and the locking chamber 433 are adjacent to one another. The latch chamber 427 contains an button 428 that in a resting position extends out of the latch chamber 427 because a button spring 429 applies pressure to the button 428. When the button 428 is pressed, the button spring 429 is compressed and the button 428 moves laterally such that its opposing sloped bottom surface 428*a* presses down on the sloped top surface of a latch 431 that pivots on a latch pivot 432 that is connected to the latch chamber 427 inside the chamber. When the sloping edge of the button 428*a* presses down on the latch 431, the latch spring 430 is compressed, thereby allowing the locking end of the latch 431 to rise. When the platform to which the latch chamber 427 is affixed is moved toward the platform to which the locking chamber 433 is affixed, the latch 431 moves inside the cavity of the locking chamber such that the force of the bottom sloping surface of the latch 431 moving against the top sloping surface of the locking chamber cavity 434 compresses the latch spring 430 until the latch 431 is fully inserted into the locking chamber such the that lower lip of the latch extends beyond the upper lip 435 of the upper surface of the locking chamber 434, thereby relieving the pressure on the latch spring 430 which then presses the latch 431 down into a locked position in the locking chamber 433.

While the specific embodiments have been illustrated and described, numerous modifications come to mind without significantly departing from the spirit of the invention, and the scope of protection is only limited by the scope of the accompanying claims.

What is claimed is:

1. A child seat restraining device comprising:
   a stationary base having a bottom side, a top side, and a securing mechanism wherein said stationary base is securable against a vehicle seat,
   a mobile platform movably attached to said base wherein said mobile platform is selectively movable in a plane substantially parallel with respect to said stationary base between a first ready position and a second loading position,
   a locking mechanism for releasably locking said mobile platform into the ready position, and
   a child seat securing apparatus wherein a child seat can be removably secured to said mobile platform,
   wherein said mobile platform can be displaced laterally from said base in a direction substantially parallel to a seat back of a vehicle without requiring any substantial displacement of said mobile platform in a direction perpendicular to said seat back, and wherein said loading position is closer to a vehicle door than said ready position when said device is installed substantially in the center of a vehicle seat.

2. The child seat restraining device according to claim 1, wherein said securing mechanism comprises a vehicle seat belt receiving member configured to receive a portion of a vehicle seat belt to secure said stationary base to a vehicle seat.

3. The child seat restraining device according to claim 1, wherein said securing mechanism comprises base mounting tethers mounted to said stationary base for engaging anchors mounted in a vehicle.

4. The child seat restraining device according to claim 1, wherein said mobile platform is integral with a child seat base.

5. The child seat restraining device according to claim 1, wherein said child seat securing apparatus comprises a securing belt mounted to said mobile platform for securing a child seat to said mobile platform.

6. The child seat restraining device according to claim 1, wherein said child seat securing apparatus comprises anchors on said mobile platform for engaging child seat tethers on a child seat.

7. The child seat restraining device according to claim 1, wherein the bottom side of said stationary base comprises a non-slip surface for reducing slippage between said stationary base and a surface of a vehicle seat.

8. The child seat restraining device according to claim 1, wherein said mobile platform is slidably mounted on said stationary base.

9. The child seat restraining device according to claim 8, wherein said mobile platform is mounted to said stationary base via extension rail members, and wherein at least one of said extension rail members is fixedly mounted to said stationary base and at least one extension rail member is fixedly mounted to said mobile platform, said extension rail members engaging one another wherein said mobile platform is laterally movable with respect to said stationary base.

10. The child seat restraining device according to claim 8, further comprising support wheels mounted to said mobile platform and extending toward a vehicle seat when said device is mounted on such a seat, wherein a portion of the weight of said mobile platform and any load bearing upon said mobile platform is supported by such a vehicle seat via said wheels.

11. The child seat restraining device according to claim 10, wherein said stationary base further comprises grooves cut in alignment with said wheels to allow said wheels to contact such a vehicle seat through a range of positions of said mobile platform between the ready position and the loading position.

12. The child seat restraining device according to claim 1, wherein said mobile platform further comprises a handle for manipulation of said mobile platform.

13. The child seat restraining device according to claim 1, wherein said stationary base further comprises a security rail extending from said base and adapted to engage a portion of said mobile platform when said mobile platform is in the ready position to further prevent relative motion between said mobile platform and said stationary base.

14. The child seat restraining device according to claim 1, wherein said stationary base further comprises an integral lip configuration which overlaps a portion of said mobile platform to reduce relative vertical displacement between said stationary base and said mobile platform.

15. The child seat restraining device according to claim 1, wherein said mobile platform is mounted to said stationary base via extension rail members, and wherein at least one of said extension rail members is fixedly mounted to said stationary base and at least one extension rail member is fixedly mounted to said mobile platform, said extension rail members engaging one another wherein said mobile platform is laterally movable with respect to said stationary base, and further comprising support wheels mounted to said mobile platform and extending toward a vehicle seat when said device is mounted on such a seat, wherein said stationary base further comprises grooves cut in alignment with said wheels to allow said wheels to contact such a vehicle seat through a range of positions of said mobile platform between the ready position and the loading position, wherein a portion of the weight of said mobile platform and any load bearing upon said mobile platform is supported by such a vehicle seat via said wheels, and wherein said stationary base further comprises a security rail extending from said base and adapted to engage a portion of said mobile platform when said mobile platform is in the ready position to further prevent relative motion between said mobile platform and said stationary base.

16. The child seat restraining device according to claim 1, wherein said mobile platform is mounted to said stationary base in a manner which allows for rotational movement between said mobile platform and said stationary base.

17. The child seat restraining device according to claim 16, wherein said mobile platform is mounted to said stationary base via at least one rotating arm, said arm having at least two segments which are pivotally connected with respect to each other at inner ends, one of said segments being pivotally connected at an outer end to said mobile platform or a mounting thereon, the other of said segments being pivotally connected at an outer end to said stationary base or a mounting thereon, wherein said mobile platform is rotatably movable and laterally movable with respect to said stationary base.

18. The child seat restraining device according to claim 17, wherein said mobile platform is mounted to said stationary base via at least two rotating arms, each of said arms having at least two segments which are pivotally connected with respect to each other at inner ends, one of said segments being pivotally connected at an outer end to said mobile platform or a mounting thereon, the other of said segments being pivotally connected at an outer end to said stationary base or a mounting thereon, wherein said mobile platform is rotatably movable and laterally movable with respect to said stationary base.

19. A child seat restraining device comprising:

a stationary base having a bottom side, a top side, and a securing mechanism wherein said stationary base is securable against a vehicle seat, a middle platform movably mounted above said stationary base, an upper platform movably mounted above said middle platform and comprising a child seat securing apparatus wherein a child seat can be removably secured to said upper platform, a first locking mechanism for releasably locking at least one of said middle platform and said upper platform with respect to said stationary base, wherein one of said middle platform and said upper platform is a slidably mounted mobile platform wherein said mobile platform is selectively movable in a plane substantially parallel with respect to said stationary base between a first ready position and a second loading position, wherein the other of said middle platform and said upper platform is a rotatably mounted rotating platform wherein said rotating platform is rotatable with respect to said stationary base, and wherein said mobile platform can be displaced laterally from said base in a direction substantially parallel to a seat back of a vehicle, wherein said loading position is closer to a vehicle door than said ready position when said device is installed substantially in the center of a vehicle seat, and wherein said rotating platform can be rotated with respect to said stationary base to rotate a child seat attached to said upper platform into a desired position for convenience when loading, yet into a rear-facing or front-facing position when the mobile platform is in the ready position.

20. The child seat restraining device according to claim 19, wherein said rotating platform is rotatable when said mobile platform is in the ready position.

21. The child seat restraining device according to claim 19, wherein said rotating platform is rotatable when said mobile platform is in the loading position.

22. The child seat restraining device according to claim 21, further wherein said rotating platform is rotatable when said mobile platform is in the ready position.

23. The child seat restraining device according to claim 19, wherein said first locking mechanism is adapted to releasably lock both said mobile platform and said rotating platform with respect to said stationary base.

24. The child seat restraining device according to claim 19, wherein said first locking mechanism is adapted to releasably lock only one of said mobile platform or said rotating platform with respect to said stationary base, and further comprising a second locking mechanism for releasably locking said rotating platform with respect to said mobile platform independently of said first locking mechanism.

25. The child seat restraining device according to claim 19, wherein said stationary platform further comprises a security rail adapted to engage at least one of said mobile platform and said rotating platform to secure and reduce relative movement therebetween when engaged.

26. The child seat restraining device according to claim 25, wherein said security rail is adapted to engage both said mobile platform and said rotating platform.

27. The child seat restraining device according to claim 19, wherein said device further comprises a handle for manipulation on at least one of said mobile platform and said rotating platform.

28. The child seat restraining device according to claim 19, wherein the bottom side of said stationary base comprises a non-slip surface for reducing slippage between said stationary base and a surface of a vehicle seat.

29. The child seat restraining device according to claim 19, wherein said securing mechanism comprises a vehicle seat belt receiving member configured to receive a portion of a vehicle seat belt to secure said stationary base to a vehicle seat.

30. The child seat restraining device according to claim 19, wherein said securing mechanism comprises base mounting tethers mounted to said stationary base for engaging anchors mounted in a vehicle.

31. The child seat restraining device according to claim 19, wherein said upper platform is integral with a child seat base.

32. The child seat restraining device according to claim 19, wherein said child seat securing apparatus comprises a securing belt mounted to said upper platform for securing a child seat to said upper platform.

33. The child seat restraining device according to claim 19, wherein said child seat securing apparatus comprises anchors on said upper platform for engaging child seat tethers on a child seat.

34. The child seat restraining device according to claim 19, wherein said middle platform is said mobile platform, and wherein said upper platform is said rotating platform.

35. The child seat restraining device according to claim 34, wherein said mobile platform is mounted to said stationary base via extension rail members, and wherein at least one of said extension rail members is fixedly mounted to said stationary base and at least one extension rail member is fixedly mounted to said mobile platform, said extension rail members engaging one another wherein said mobile platform is laterally movable with respect to said stationary base.

36. The child seat restraining device according to claim 34, further comprising support wheels mounted to said mobile platform and extending toward a vehicle seat when said device is mounted on such a seat, wherein a portion of the weight of said mobile platform and any load bearing upon said mobile platform is supported by such a vehicle seat via said wheels.

37. The child seat restraining device according to claim 36, wherein said stationary base further comprises grooves cut in alignment with said wheels to allow said wheels to contact such a vehicle seat through a range of positions of said mobile platform between the ready position and the loading position.

38. The child seat restraining device according to claim 34, wherein said stationary base further comprises an integral lip configuration which overlaps a portion of said mobile platform to reduce relative vertical displacement between said stationary base and said mobile platform.

39. The child seat restraining device according to claim 34, wherein said mobile platform further comprises an integral lip configuration which forms a circular cavity having an interface surface within the mobile platform and which overlaps a portion of a base pedestal of said rotating platform to reduce relative vertical displacement between said mobile platform and said rotating platform.

40. The child seat restraining device according to claim 34, further comprising rotational bearings between said rotating platform and said mobile platform, wherein said bearings facilitate smooth rotation of said rotating platform with respect to said mobile platform.

41. The child seat restraining device according to claim 39, wherein said stationary base further comprises an integral lip configuration which overlaps a portion of said mobile platform to reduce relative vertical displacement between said stationary base and said mobile platform.

42. The child seat restraining device according to claim 34, wherein said rotating platform can be selectively rotated and positioned into either of two loading positions, a first one of said loading positions configured with a rear-facing end of a child seat which faces a seat back when in a locked position rotated to face away from a loading door of a vehicle when said mobile platform is in the loading position, and a second one of said loading positions configured with the rear-facing end of a child seat which faces a seat back when in a locked position rotated to face toward such a loading door of a vehicle when said mobile platform is in the loading position.

43. The child seat restraining device according to claim 19, wherein said middle platform is said rotating platform, and wherein said upper platform is said mobile platform.

44. The child seat restraining device according to claim 43, further comprising support wheels mounted to said mobile platform and extending toward a vehicle seat when said device is mounted on such a seat, wherein a portion of the weight of said mobile platform and any load bearing upon said mobile platform is supported by such a vehicle seat via said wheels.

45. The child seat restraining device according to claim 43, wherein said rotating platform further comprises an integral lip configuration which overlaps a portion of said mobile platform to reduce relative vertical displacement between said rotating platform and said mobile platform.

46. The child seat restraining device according to claim 43, wherein said stationary base further comprises an integral lip configuration which forms a circular cavity having an interface surface within the stationary base and which overlaps a portion of a base pedestal of said rotating platform to reduce relative vertical displacement between said stationary base and said rotating platform.

47. The child seat restraining device according to claim 46, wherein said rotating platform further comprises an integral lip configuration which overlaps a portion of said mobile platform to reduce relative vertical displacement between said rotating platform and said mobile platform.

48. The child seat restraining device according to claim 43, further comprising rotational bearings between said rotating platform and said stationary base, wherein said bearings facilitate smooth rotation of said rotating platform with respect to said stationary base.

49. The child seat restraining device according to claim 43, wherein said mobile platform is mounted to said rotating platform via extension rails, and wherein at least one extension rail member is fixedly mounted to said rotating platform and at least one extension rail member is fixedly mounted to said mobile platform, said extension rail members engaging one another wherein said mobile platform is laterally movable with respect to said rotating platform.

50. The child seat restraining device according to claim 19, wherein said rotating platform can be rotated in a manner such that a rear-facing side of a child seat which faces a seat back when in a locked position can be rotated to face away from a loading door of a vehicle when said mobile platform is in the loading position.

51. The child seat restraining device according to claim 19, wherein said rotating platform can be rotated in a manner such that a rear-facing side of a child seat which faces a seat back when in a locked position can be rotated to face toward a loading door of a vehicle when said mobile platform is in the loading position.

52. A method for manufacturing a child seat restraining device comprising the steps of:
   providing a stationary base having a bottom side and a top side,
   providing a securing mechanism to enable the stationary base to be secured against a vehicle seat,
   providing a mobile platform movably attached to said device with respect to the base wherein the mobile platform is selectively movable in a plane substantially parallel with respect to said stationary base between a first ready position and a second loading position,
   providing a locking mechanism for releasably locking said mobile platform into the ready position, and
   providing a child seat securing apparatus wherein a child seat can be removably secured to said device,
   wherein said mobile platform can be displaced laterally from said base in a direction substantially parallel to a seat back of a vehicle without requiring any substantial displacement of said mobile platform in a direction perpendicular to said seat back, and wherein said loading position is closer to a vehicle door than said ready position when said device is installed substantially in the center of a vehicle seat.

53. The method for manufacturing a child seat restraining device according to claim 52, further comprising the step of:
   rotatably mounting a rotating platform above the mobile platform, and
   wherein the step of providing a child seat securing apparatus is performed by providing the child seat securing apparatus on the rotating platform.

17

54. The method for manufacturing a child seat restraining device according to claim 53, wherein the rotating platform is integral with a child seating member.

55. The method for manufacturing a child seat restraining device according to claim 52, further comprising the step of:
  rotatably mounting a rotating platform between the mobile platform and the stationary base, wherein the rotating platform is rotatable with respect to the stationary base, and
  wherein the step of providing a child seat securing apparatus is performed by providing the child seat securing apparatus on the mobile platform.

56. The method for manufacturing a child seat restraining device according to claim 52, wherein the mobile platform is integral with a child seating member, and wherein the child seat securing apparatus comprises a mounting apparatus for mounting the mobile platform to the device.

57. A child seat restraining device comprising:
  a stationary base having a bottom side, a top side, and a securing mechanism wherein said stationary base is securable against a vehicle seat,
  a mobile platform attached to said device wherein said mobile platform is selectively movable with respect to said stationary base in a plane substantially parallel with respect to said stationary base between a first ready position and a second loading position,
  a locking mechanism for releasably locking said mobile platform into the ready position, and
  wherein said mobile platform can be displaced laterally with respect to said base from the ready position in a direction substantially parallel to a seat back of a vehicle into which said device is installed without requiring any substantial displacement of said mobile platform in a forward direction with respect to the seat back of the vehicle, and wherein the loading position is closer to a vehicle door than the ready position when said device is installed substantially in the center of a vehicle seat.

58. The child seat restraining device according to claim 57, wherein said mobile platform is integral with a child seating member.

59. The child seat restraining device according to claim 58, wherein said mobile platform is removably attached to said device.

60. The child seat restraining device according to claim 58, wherein said mobile platform is mounted to said stationary base via extension rails, and wherein at least one extension rail member is fixedly mounted to said stationary base and at least one extension rail member is fixedly mounted to said mobile platform, said extension rail members engaging one another wherein said mobile platform is laterally movable with respect to said stationary base.

18

61. The child seat restraining device according to claim 58, wherein said stationary base further comprises an integral lip configuration which overlaps a portion of said mobile platform to reduce relative vertical displacement between said stationary base and said mobile platform.

62. The child seat restraining device according to claim 57, wherein said device comprises a middle platform movably mounted above said stationary base, and an upper platform movably mounted above said middle platform, wherein one of said middle platform and said upper platform is said mobile platform, and the other of said middle platform and said upper platform is a rotating platform, and wherein said upper platform is integral with a child seating member.

63. The child seat restraining device according to claim 62, wherein said upper platform is removably mounted to said device.

64. The child seat restraining device according to claim 62, wherein said upper platform is said rotating platform and said middle platform is said mobile platform.

65. The child seat restraining device according to claim 64, wherein said rotating platform can be selectively rotated and positioned into either of two loading positions, a first one of said loading positions configured with a rear-facing end of said child seating member which faces a seat back when in a locked position rotated to face away from a loading door of a vehicle when said mobile platform is in the loading position, and a second one of said loading positions configured with the rear-facing end of said child seating member which faces a seat back when in a locked position rotated to face toward such a loading door of a vehicle when said mobile platform is in the loading position.

66. The child seat restraining device according to claim 64, wherein said mobile platform further comprises an integral lip configuration which forms a circular cavity having an interface surface within the mobile platform and which overlaps a portion of a base pedestal of said rotating platform to reduce relative vertical displacement between said mobile platform and said rotating platform.

67. The child seat restraining device according to claim 62, wherein said upper platform is said mobile platform and said middle platform is said rotating platform.

68. The child seat restraining device according to claim 67, wherein said stationary base further comprises an integral lip configuration which forms a circular cavity having an interface surface within the stationary base and which overlaps a portion of a base pedestal of said rotating platform to reduce relative vertical displacement between said stationary base and said rotating platform.

\* \* \* \* \*